Nov. 10, 1959 H. RINIA 2,911,792
THERMODYNAMIC APPARATUS WITH CLOSED PIPE SYSTEM
Filed March 6, 1957 5 Sheets-Sheet 1
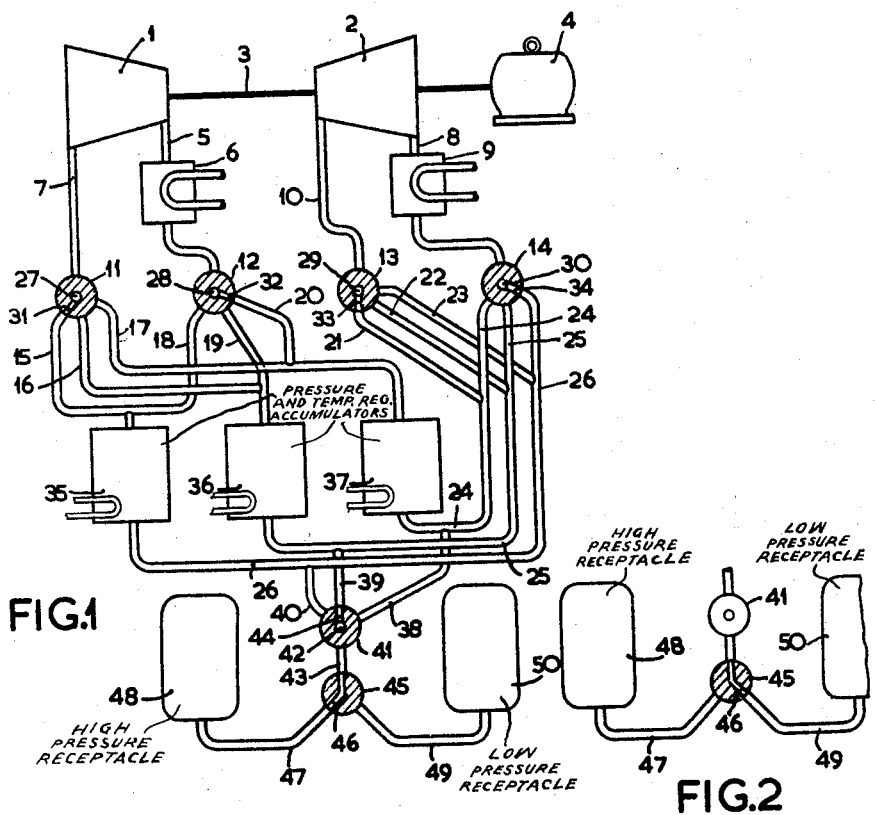
FIG.1
FIG.2
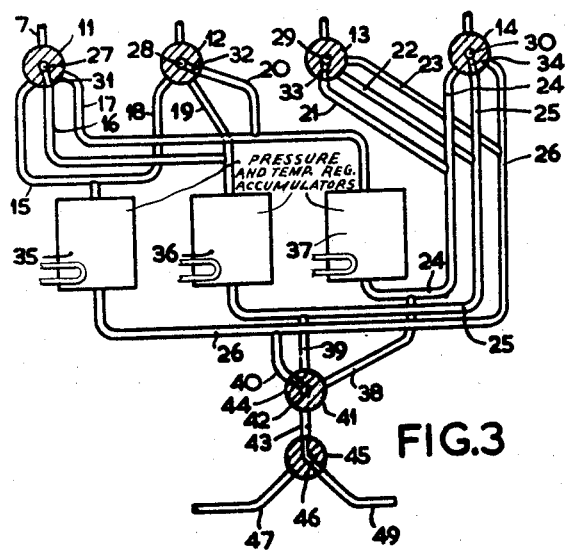
FIG.3
INVENTOR
HERRE RINIA
BY
Frank R. Trifari
AGENT United States Patent Office 2,911,792
Patented Nov. 10, 1959

2,911,792

THERMODYNAMIC APPARATUS WITH CLOSED PIPE SYSTEM

Herre Rinia, Eindhoven, Netherlands, assignor to North American Philips Company, Inc., New York, N.Y., a corporation of Delaware Application March 6, 1957, Serial No. 644,292

Claims priority, application Netherlands March 6, 1956

5 Claims. (Cl. 60—59)

This invention relates to a system comprising a closed pipe system in which a compressor and an expansion apparatus are included, in which system a gas of invariable physical state performs a closed thermodynamic cycle. Such systems, which generally are provided with a turbine compressor and an expansion turbine, are usually designed as prime movers. In the known systems, the gas which is compressed by the compressor is pre-cooled by means of water and subsequently further cooled in a heat-exchanger in which it is in heat exchanging contact with the gas which has been expanded in the turbine. In large systems, however, this heat-exchanger becomes very bulky and its construction is comparatively complicated.

Instead of these heat-exchangers, use might be made of pressure and temperature regulating accumulators. In this event, one of these accumulators might be connected to the high-pressure part of the pipe system and the other to the low-pressure part of the pipe system. However, changing over these accumulators involves a pressure exchange between the accumulator connected in the low-pressure part and the accumulator connected in the high-pressure part of the pipe system. This pressure exchange generally adversely affects the efficiency of the system.

It is an object of the invention to reduce this adverse effect to a minimum.

According to the invention, an accumulator is provided both in the high-pressure part of the pipe system between the compressor and the expansion apparatus and in the low-pressure part of the pipe system between the compressor and the expansion apparatus, an amount of thermal energy being supplied to the gas in one of these accumulators and being withdrawn from the gas in the other pressure and temperature regulating accumulator, the system including at least one additional accumulator and provision being made of means by which the accumulator connected to the high-pressure part of the pipe system and/or the accumulator connected to the low-pressure part of the pipe system can be replaced by another accumulator and the disconnected accumulator or accumulators can be connected to at least one space in which a pressure obtains which lies between that of the high pressure part of the pipe system and that in the low pressure part of the pipe system, the accumulator or accumulators being subsequently connected to the low-pressure and/or high pressure part of the pipe system so that always at least three accumulators are involved in the change-over process.

The system can be designed for use as a prime mover. It may, however, be used as a refrigerator or as a heat pump.

In one embodiment of the invention, provision is made of a number of spaces in which pressures obtain which lie between that of the high-pressure part and that of the low pressure part of the pipe system, and are different in the different spaces, means being provided by which the last accumulator having been connected to the high-pressure part after its disconnection from this part can be connected in succession to spaces having increasingly lower pressures, while the last heat exchanger having been connected to the low-pressure part can successively be connected to spaces having increasingly higher pressures. In this manner, the pressure exchange is effected in a number of stages, so that the energy losses owing to changing-over are further reduced. The spaces to which the accumulator is connected, may be receiver spaces. However, provision may also be made of at least four accumulator spaces, an accumulator, the pressure of which must be increased, being connected to an accumulator, the pressure in which must be decreased. The compressor and the expansion apparatus may be designed as reciprocating apparatus, however, in large systems use is preferably made of a turbine compressor and an expansion turbine.

In a further embodiment of the invention, either, the turbine compressor or the expansion turbine has a number of compression or expansion stages, respectively, an accumulator being connected, in changing-over, to stages of increasingly lower or increasingly higher pressures. In this event, parts of the expansion turbine or of the turbine compressor act as spaces. In a still further embodiment of the invention, the accumulators are preferably connected to the space at their sides exhibiting the smallest temperature difference from the ambient temperature, so that in this event the valves or cocks by means of which the accumulators are changed over, are operated at a temperature which differs as little as possible from the ambient temperature.

In a further embodiment of the invention, the accumulators are connected not only to a stage of the compressor, but also to a stage of the turbine during changing-over.

In order that the invention may readily be carried out, some embodiments thereof will now be described in detail, by way of example, with reference to the accompanying diagrammatic drawings, in which:

Fig. 1 shows a system provided with three accumulators which, during changing-over, can be connected to two auxiliary spaces having different pressures.

Figures 2, 3, 4, 5, 6 and 7 show various switching positions,

Figure 4:
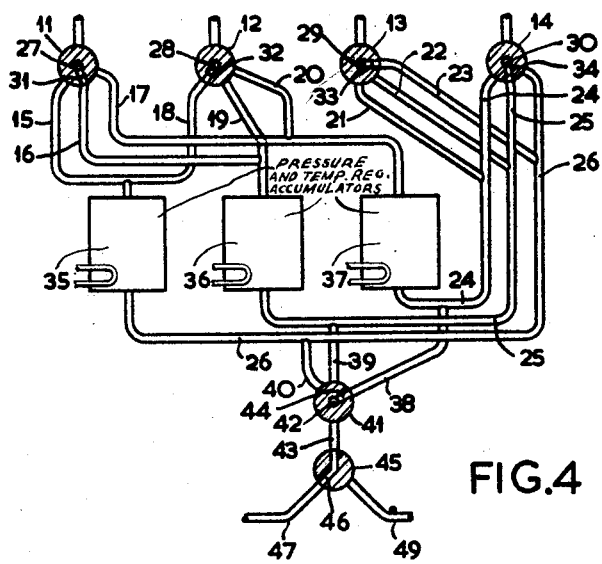

The system shown in Fig. 1 comprises a closed pipe system including a turbine compressor 1 and an expansion turbine 2. The turbine compressor 1 and the expansion turbine 2 have a common shaft 3, to which a motor 4 is also coupled. A discharge pipe 5 for the compressed gas is connected to the compressor 1 and includes a water cooler 6. The compressor 1 also has a supply pipe 7; similarly, the expansion turbine 2 has a discharge pipe 8 containing a heat-exchanger 9 and a supply pipe 10.

The pipes 7, 5, 10 and 8 are each connected to a cock 11, 12, 13 and 14 respectively. These cocks are not only connected to these pipes 7, 5, 10, 8 but they are also connected each to three pipes 15, 16 and 17, 18, 19 and 20; 21, 22 and 23; 24, 25 and 26, respectively. Each cock has a central aperture 27, 28, 29 and 30, respectively, with which the pipes 7, 5, 10 and 8 are in constant communication, and a radial duct 31, 32, 33 and 34, respectively, which can be made to communicate with one of the pipes 15 to 26 by turning the cocks.

The pipes 15, 18, 23 and 26 are connected to a pressure and temperature regulating accumulator 35; similarly, the pipes 16, 19, 22 and 25 are connected to a pressure and temperature regulating accumulator 36 and the pipes 17, 20, 21 and 24 to an accumulator 37.

The pipes 24, 25 and 26 are connected to pipes 38, 39 and 40, respectively, which are connected to a cock 41. This cock has a central duct 42 which is continuously connected to a pipe 43, and a radial duct 44 by means of which the pipe 43 can be made to communicate with the pipes 38, 39 and 40. The pipe 43 is connected to a three way cock 45 having a duct 46, so that the pipe 43 can be connected either, through a pipe 47, to a space 48 or, through a pipe 49, to a space 50, as is shown in Fig. 2.

The system operates as follows: In the compressor 1 a gas, for example hydrogen, is compressed and supplied through the pipe 5, the central duct 28 of the cock 12, the radial duct 32 and the pipes 20 and 17 to the accumulator 37. This accumulator is filled in known manner with a filler, with which the gas flowing through the accumulator is in heat-exchanging contact. If the system is used as a refrigerator, in the accumulator 37 thermal energy is withdrawn from the gas. The gas subsequently flows through the pipes 24 and 21 to the cock 13 and then through the radial duct 33, the central duct 29 and the pipe 10 to the turbine 2.

In this turbine, the gas is expanded so that it is further cooled, after which it flows through the pipe 8 to the cock 14. In the heat-exchanger 9, the gas withdraws energy from a medium to be cooled.

Through the central duct 30 and the radial duct 34 of the cock 14 and the pipe 26, the gas flows to the accumulator 35, in which it is heated, and then through the pipe 15 to the cock 11. Through the radial duct 31 and the central duct 27 and the pipe 7, the gas flows to the turbine compressor 1. During this period, the accumulator 36 is connected, through the pipes 25, 39 and the ducts 44 and 42 of the cock 41 to the pipe 43 and the cock 45.

The pressure in the space 48 lies between the pressures in the pipes 5 and 7 and this also holds for the pressure in the space 50 which, however, is lower than the pressure in the space 48. During the period that the gas flows through the accumulators 35 and 37, the accumulator 36 is first caused to communicate with the space 48 so that the pressure of the gas in this accumulator falls off and subsequently, by adjustment of the cock 45, with the space 50 (Fig. 2) so that the pressure in the accumulator 36 is further decreased. After some time, the accumulator 35 becomes too cold so that it must be changed over. The new position of the cocks is shown in Fig. 3. By changing over the cocks 11 and 14, the accumulator 36 is connected in the pipe system. The pipe 7 is connected, through the ducts 31 and 27 and the pipe 16, to the accumulator 36, the pipe 8 being connected to this accumulator through the ducts 30, 34 and the pipe 25.

The accumulator 35, which was connected in the low pressure part of the pipe system, is connected, through pipes 26 and 40 and ducts 44 and 42, to the pipe 43 and subsequently, through the duct 46 of the cock 45 and the pipe 49, to the low-pressure vessel 50. As a result, the pressure of the gas in the accumulator is increased. Then the cock 45 is set in another position so that accumulator is connected, through the pipe 47, to the high-pressure vessel 48 so that the pressure is further increased.

One period later, the heat exchanger 37 threatens to become too hot. Consequently, the cocks are set in the position shown in Fig. 4. The accumulator 35, which initially had assumed a low temperature and the pressure of which is increased, is connected by a change in the setting of the cocks 12 and 13, through ducts 28 and 32 of the cock 12, pipes 18, 26 and 23 and ducts 33 and 29 of the cock 13, to the pipes 5 and 10.

The heat-exchanger 37 is connected, through pipes 24, 38, ducts 44 and 42 of the cock 41, pipe 43, duct 46 of the cock 45 and pipe 47, to the high-pressure vessel 48, so that the pressure of the gas in the accumulator is decreased. By changing the setting of the cock 45, so that the accumulator 37 is connected to the low-pressure vessel 50, the pressure in this accumulator can be further decreased.

Figure 5:
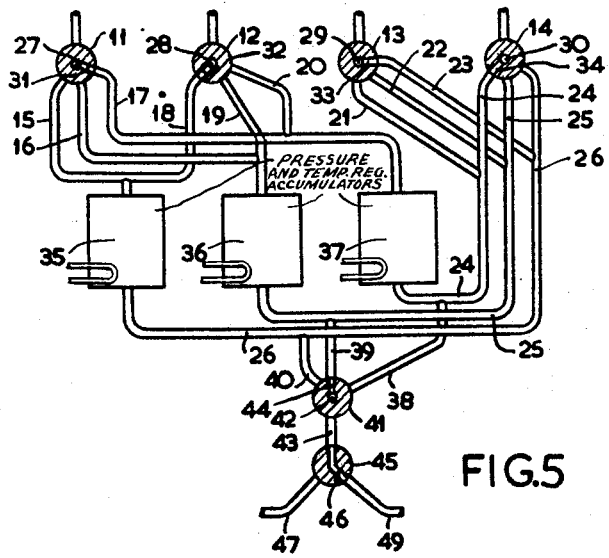

One period later, the accumulator 36 threatens to become too cold. The cocks 11 and 14 are therefore changed to the positions shown in Fig. 5. Thus, the accumulator 37 is connected to the low-pressure part of the pipe system through ducts 27, 31 of the cock 11, pipes 17, 24 and ducts 34, 30 of the cock 14. The accumulator 36, which initially was connected to the low-pressure part of the pipe system, is now connected, through pipes 25, 39 ducts 44, 42 pipe 43, duct 46 and pipe 49, to the low-pressure vessel 50, so that the pressure in the accumulator is increased. Then the position of the cock 45 is changed, so that the accumulator communicates with the high-pressure vessel 48 and its pressure is further increased.

Figure 6:
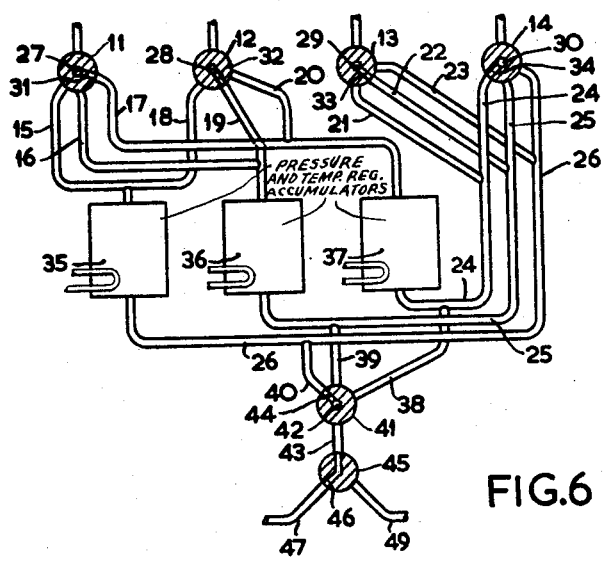

Fig. 6 shows the condition obtaining one period later. The accumulator 35 is connected to the high pressure vessel 48, so that the pressure of the gas in the accumulator is decreased, and subsequently the accumulator is connected to the low-pressure vessel, so that the pressure is further decreased.

The accumulator 36 is coupled to the high-pressure part of the pipe system through the cocks 12 and 13.

Figure 7:
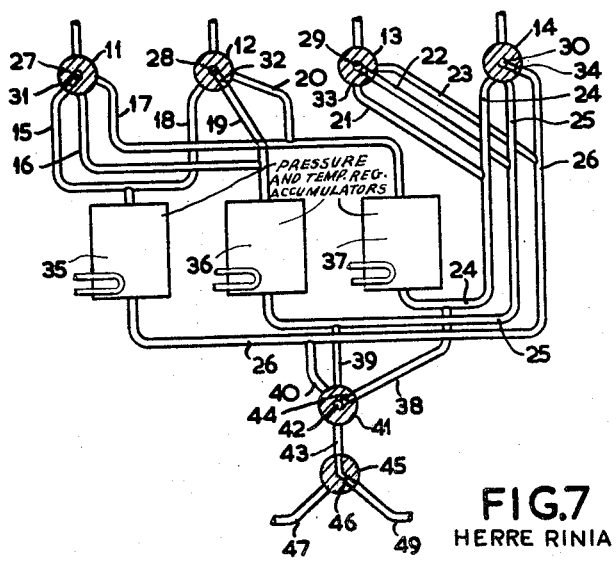

In the condition shown in Fig. 7, the accumulator 37 is connected to the lower-pressure vessel 50 and subsequently to the high-pressure vessel 48, so that the pressure in the accumulator is further increased.

The accumulator 35 is caused to communicate with the low-pressure part of the pipe system by the cocks 11 and 14.

In the next period, the condition of Fig. 1 is again obtained and one changing-over cycle is completed.

By changing-over the accumulators to the pressure vessels, the pressure in the vessels is increased during one period and again decreased in the next subsequent period. The higher the number of pressure vessels, the smaller are the losses owing the pressure exchange.

The method described hereinbefore can also be used if the turbine compressor and the expansion turbine are replaced by a reciprocating compressor and a reciprocating expansion apparatus.

Figure 8:
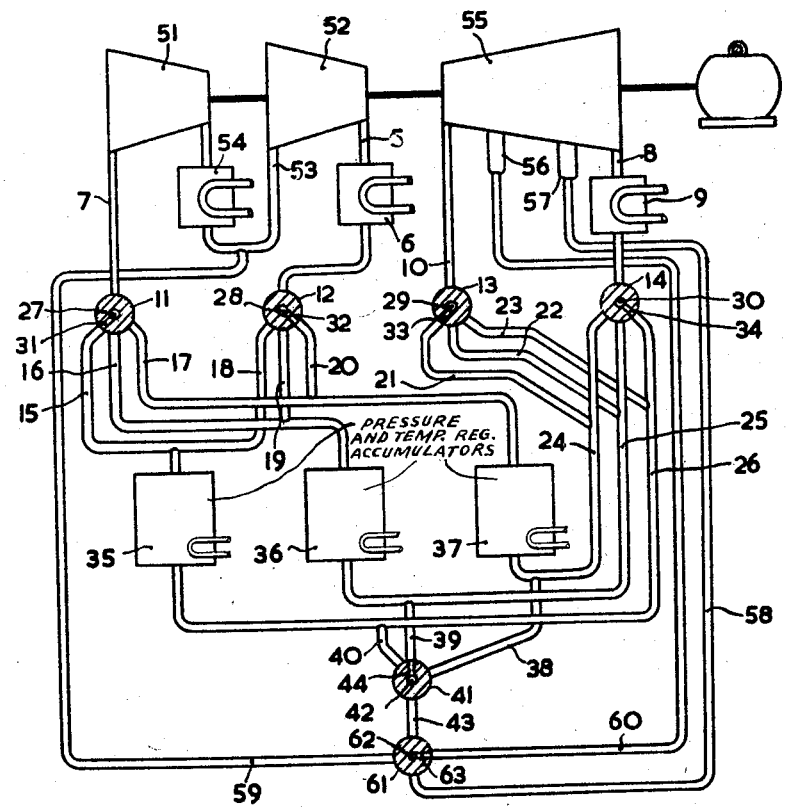
Fig. 8 shows a system in which three accumulators are also provided which, however, can be connected to pressure stages of the turbine compressor and of the expansion turbine, whilst
Figure 9:
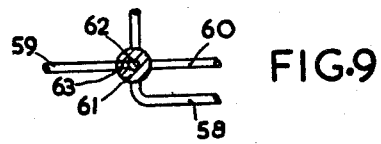
Figures 9 and 10 show two switching positions.
Figure 10:
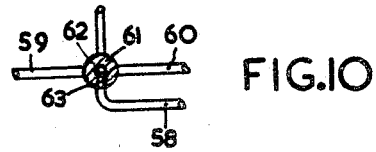

Fig. 8 shows another embodiment, and Figures 9 and 10 show different change over positions.

In Fig. 8, parts corresponding to those of Fig. 1 are designated by like reference numerals.

The system has a low-pressure turbine compressor 51 and a high-pressure turbine compressor 52 which are interconnected through a pipe 53 containing a water cooler 54.

The system has an expansion turbine 55 comprising three stages which are connected to one another by means of pipes 56 and 57. Similarly to the switching position shown in Fig. 1 the accumulator 35 is included in the low-pressure part of the pipe system in the position shown in Fig. 8, since it communicates through ducts 27, 31 of the cock 11, pipes 15 and 26, ducts 34 and 30 of the cock 14, with pipes 7 and 8.

The accumulator 37 is connected in the high-pressure part of the pipe system, since it communicates by means of ducts 28, 32 of cock 12, pipes 20, 17, 24, 21 and ducts 33, 29 of cock 13, with the pipes 5 and 10. The accumulator 36, which, as will be seen from Fig. 7 (the connection of Fig. 8 entirely corresponds to that of Figures 1 to 7) in a prior position was connected to the high-pressure part of the pipe system, must have its pressure decreased. The pressure in the pipe 56 is higher than that in the pipe 53 and this is in turn higher than the pressure in the pipe 57. The pressure of the accumulator 36 can therefore be decreased by connecting this accumulator in succession to the pipes 57, 53 and 56.

To this end, the pipes 57, 53 and 56 are coupled, by means of pipes 58, 59 and 60 respectively, to a cock 61 to which the pipe 43 is connected. In the position of the cock 61 shown in Fig. 8 which cock has a central duct 62 and a radial duct 63, the accumulator 36 is connected, through pipes 25, 39 ducts 44, 42 of the cock 41, pipe 43, ducts 62, 63 and pipes 60 and 56, to a stage of the turbine, so that the pressure of the gas in the accumulator is decreased and part of the gas is expanded in the turbine.

Subsequently, the cock 61 is set to the position shown in Fig. 9. Now, the accumulator is connected, through pipes 59, 53, to the compressor 52, so that the pressure of the gas in this accumulator is further decreased.

Then the cock 61 is set to the position shown in Fig. 10. In this event, the accumulator is connected, through pipes 58, 57 to the low-pressure stage of the turbine, so that the pressure of the gas in the accumulator is further decreased.

Now, the cocks 11, 12, 13 and 14 can be set to the position shown in Fig. 3. In each of the positions shown in Figures 3 to 7, an accumulator can successively have its pressure increased or decreased by turning the cock 61.

Figure 11:
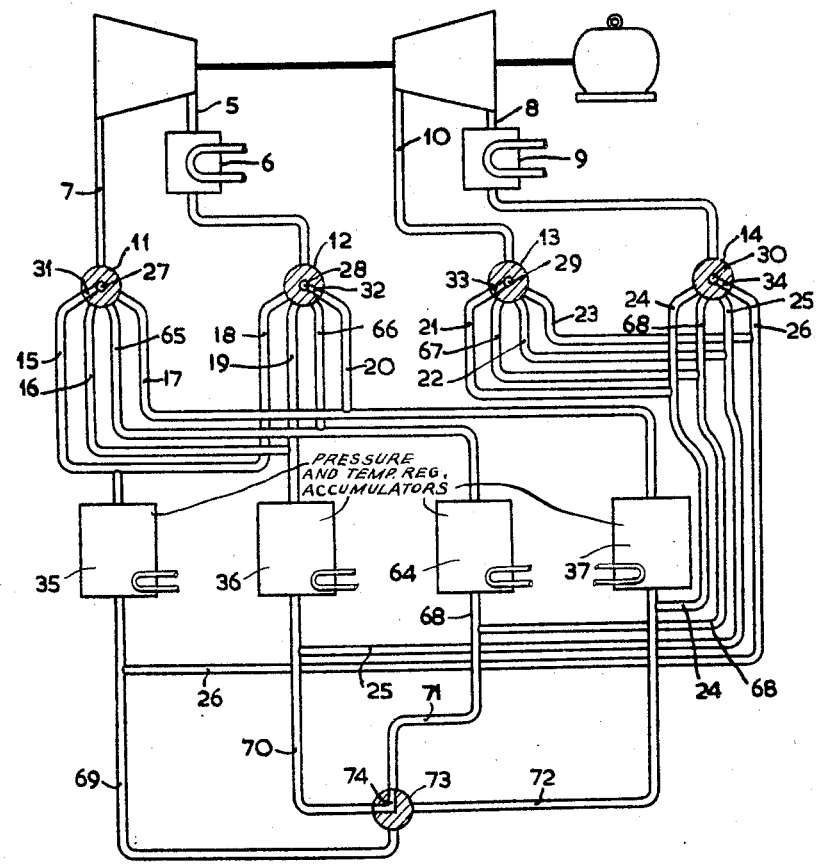
Fig. 11 shows a system provided with four accumulators of which two are connected together whenever a change over is effected.

In the system shown in Fig. 11, parts corresponding to those of Fig. 1 are designated by like reference numerals. The system has four accumulators 35, 36, 37 and 64, each of the cocks 11, 12, 13 and 14 having four pipes to which the radial ducts 31, 32, 33 and 34, respectively, can be connected.

The accumulator 64 is connected to the cocks 11, 12, 13 and 14 by means of pipes 65, 66, 67 and 68, respectively.

Furthermore, the accumulators are provided with pipes 69, 70, 71 and 72 which are connected to a cock 73. Through a duct 74 in the cock, either the pipes 70 and 71 or the pipes 69 and 72 can be connected together.

In the condition shown in Fig. 10, the accumulator 35 is connected in the low-pressure part and the accumulator 37 in the high pressure part of the pipe system. The accumulator 36, which in a prior period was coupled to the low-pressure part of the pipe system, and the accumulator 64, which in this period was coupled to the high-pressure part of the pipe system, communicate with one another through pipes 25, 70, the duct 74 of the cock 73 and pipes 71, 68. This gives rise to a pressure exchange, so that the pressure of the gas in the accumulator 36 is increased and the pressure of the gas in the accumulator 64 is decreased.

In the next period, the cocks 11, 12, 13 and 14 are so set that the accumulator 64 is connected to the low-pressure part and the accumulator 36 to the high-pressure part of the pipe system, the accumulators 35 and 37 communicating with one another through the cock 73. Similarly to what has been explained with reference to Fig. 1, a change-over cycle comprising 4 periods can be obtained in this manner.

If an accumulator is to be coupled, at the same time, to the pressure stage of a compressor and to the pressure stage of a turbine, in the embodiment shown in Fig. 8 cocks can be provided in the pipes 58, 59 and 60 which correspond to the cocks 11, 12, 13 and 14, so that the pipe system can be caused to communicate with all three accumulators by means of each separate cock. In this embodiment, the cock 73 can obviously be dispensed with.

What is claimed is:

1. A thermodynamic apparatus including a closed pipe system having a gas of constant physical state performing a closed thermodynamic cycle therein comprising; a compressor, an expansion device, a first pressure and temperature regulating accumulator located in the pipe system between said compressor and expansion device where said high pressure prevails, a second pressure and temperature regulating accumulator located between said compressor and expansion device where said low pressure prevails, thermal energy being supplied to the gas in one of said accumulators and withdrawn from the gas in the other accumulator, an additional pressure and temperature regulating accumulator which is adapted to selectively replace at least one of the other accumulators, a receptacle operatively and selectively connected to all of said accumulators whereby the replaced accumulator communicates with said receptacle in which a pressure prevails that is between the pressure of the high pressure part of the pipe system and the low pressure part thereof, and subsequently is selectively connected to said high pressure and low pressure parts of said pipe system.

2. A thermodynamic apparatus including a closed pipe system having a gas of constant physical state performing a closed thermodynamic cycle therein comprising; a compressor, an expansion device, a first pressure and temperature regulating accumulator located in the pipe system between said compressor and expansion device where said high pressure prevails, a second pressure and temperature regulating accumulator located between said compressor and expansion device where said low pressure prevails, thermal energy being supplied to the gas in one of said accumulators and withdrawn from the gas in the other accumulator, an additional pressure and temperature regulating accumulator which is adapted to selectively replace at least one of the other accumulators, a plurality of receptacles operatively and selectively connected to all of said accumulators whereby the replaced accumulator communicates with a selected receptacle in which a pressure prevails that is between the pressure of the high pressure part of the pipe system and the low pressure part thereof, the pressures in said receptacles being different from one another, means being provided by which the last accumulator to be connected to said high pressure part of said pipe system after having been disconnected therefrom can be connected to a succession of said receptacles having an increasingly lower pressure while the last accumulator to be connected to said low pressure part of the pipe system can be connected in succession to said receptacles having increasingly higher pressures.

3. A thermodynamic apparatus as claimed in claim 1 wherein said compressor is a turbine compressor and the expansion device is a turbine.

4. A thermodynamic apparatus as claimed in claim 3 wherein said turbine compressor is provided with a multiplicity of compression and expansion stages, and one of said accumulators being connected to stages of increasingly lower or increasingly higher pressures.

5. A thermodynamic apparatus as claimed in claim 4 wherein the one of said accumulators is connected to either a stage of the compressor or to a stage of the turbine.

References Cited in the file of this patent

UNITED STATES PATENTS

| 2,203,731 | Keller | June 11, 1940 |
| 2,341,638 | Maxtinka | Feb. 15, 1944 |
| 2,495,604 | Salzmann | Jan. 24, 1950 |

FOREIGN PATENTS

| 551,456 | Great Britain | Feb. 23, 1943 |